(12) United States Patent
Usui et al.

(10) Patent No.: US 6,915,182 B2
(45) Date of Patent: Jul. 5, 2005

(54) METHOD FOR SETTING DETERMINATION CONDITIONS USED FOR DETERMINING WHETHER MOLDED PRODUCT IS NON-DEFECTIVE OR DEFECTIVE

(75) Inventors: Kazuo Usui, Nagano (JP); Yoshitomi Uchikawa, Nagano (JP)

(73) Assignee: Nissei Plastic Industrial Co., Ltd., Nagano-ken (JP)

( * ) Notice: Subject to any disclaimer, the term of this patent is extended or adjusted under 35 U.S.C. 154(b) by 0 days.

(21) Appl. No.: 10/701,609

(22) Filed: Nov. 6, 2003

(65) Prior Publication Data

US 2004/0093115 A1 May 13, 2004

(30) Foreign Application Priority Data

Nov. 7, 2002 (JP) ......................................... 2002-323746

(51) Int. Cl.[7] .......................... B29C 39/00; B29C 45/00
(52) U.S. Cl. ...................................... 700/204; 700/197
(58) Field of Search ................................ 700/108, 109, 700/197–204; 345/173

(56) References Cited

U.S. PATENT DOCUMENTS

| | | | | |
|---|---|---|---|---|
| 5,301,120 A | * | 4/1994 | Magario | ...................... 700/201 |
| 5,326,246 A | * | 7/1994 | Usui et al. | ................... 425/145 |
| 5,815,397 A | * | 9/1998 | Saito et al. | .................. 700/204 |
| 6,338,004 B1 | * | 1/2002 | Usui | ........................... 700/200 |
| 6,704,014 B2 | * | 3/2004 | Usui et al. | ................... 345/440 |
| 2001/0024196 A1 | * | 9/2001 | Nishizawa | ................... 345/173 |

FOREIGN PATENT DOCUMENTS

| | | |
|---|---|---|
| JP | 2-106315 A | 4/1990 |
| JP | 2545465 A | 7/1996 |
| JP | 2002-79560 A | 3/2002 |

* cited by examiner

Primary Examiner—Leo Picard
Assistant Examiner—Ryan Jarrett
(74) Attorney, Agent, or Firm—Birch, Stewart, Kolasch & Birch, LLP

(57) ABSTRACT

When a determination condition is set for determining whether a molded product is non-defective or defective, a molding operation is performed a predetermined number of times. In each molding operation, an actual value of at least one monitor item which can serve as the basis for determining whether a molded product is non-defective or defective is detected. The detected actual values are displayed on a screen of a display in such a manner that a distribution of the actual values can be visually grasped. A sampling zone for the displayed actual values is designated in such a manner that a portion of the displayed actual values are contained in the sampling zone. The determination condition is automatically set on the basis of actual values contained in the sampling zone.

11 Claims, 5 Drawing Sheets

METHOD FOR SETTING DETERMINATION CONDITIONS USED FOR DETERMINING WHETHER MOLDED PRODUCT IS NON-DEFECTIVE OR DEFECTIVE

This Nonprovisional application claims priority under 35 U.S.C. §119(a) on Patent Application No(s). 2002-323746 filed in JAPAN on Nov. 7, 2003, the entire contents of which are hereby incorporated by reference.

BACKGROUND OF THE INVENTION

1. Field of the Invention

The present invention relates to a method for setting determination conditions used for determining whether a molded product is non-defective or defective.

2. Description of the Relevant Art

Generally, in production of molded products by use of an injection molding machine, conditions for determining whether a molded product is non-defective or defective (hereinafter referred to as a "determination condition") are set in advance, and whether a molded product is non-defective or defective is determined by use of the determination condition.

Conventionally, in many cases such a determination condition has been automatically set. In the case of such an automatic setting, molding data are collected during a predetermined number of shots in an early stage; a center value is obtained from the collected molding data, and a monitor range (non-defective range) is set in such a manner that the monitor range extends by a predetermined amount upward and downward from the center value. For example, in a method for automatically setting a reference value used for non-defective/defective determination of molded products disclosed in Japanese Patent Application Laid-Open (kokai) No. 2(1990)-106315, variable data for determining whether a molded product is non-defective or defective are detected during each molding cycle; and the detected variable data are compared with reference values set for the variable in order to determine whether the molded product is non-defective or defective. The reference values for the variable are automatically set in such a manner that the injection molding machine is operated in a reference value setting mode in order to detect variable data in each molding cycle; and the maximum and minimum values of the detected variable data are set as the reference values of the variable. Further, in a product non-defective/defective determination method for an injection molding machine disclosed in Japanese Patent Application Laid-Open (kokai) No. 2002-79560, determination as to whether a molded product is non-defective or defective is performed statistically, as follows. A molding condition determining process is performed so as to find molding conditions which enable stable molding of non-defective products, through a total of N shots. Subsequently, with regard to at least one actual value obtained in each shot, for each shot starting from an (N+1)-th shot, an average value and a standard deviation are calculated from actual value data of the past N shots immediately before the (N+1)-th shot, an initial multiplying factor ki is set for the calculated standard deviation, and for each shot a determination is made as to whether the actual value satisfies the relation (average value−ki×standard deviation)≦actual value≦(average value+ki×standard deviation). When the above relation is satisfied, a molded product is judged to be non-defective, and when the above relation is not satisfied, a molded product is judged to be defective. While the above determination is performed repeatedly, an optimal multiplying factor ko is set for the standard deviation. After that, the optimal multiplying factor ko is set for the standard deviation calculated for each shot, and for each shot a determination is made as to whether the actual value satisfies the relation (average value−ko×standard deviation)≦actual value≦(average value+ko×standard deviation). When the above relation is satisfied, a molded product is judged to be non-defective, and when the above relation is not satisfied, a molded product is judged to be defective. Furthermore, a method for automatically setting upper and lower limits of molding conditions of a molding machine disclosed in Japanese patent No. 2545465 uses a control apparatus using a micro computer for driving and controlling respective portions of the molding machine on the basis of various preset molding operation condition values and measurement information from various sensors. In order to determine quality of molded product during a continuous automatic operation, the control apparatus not only has a function for comparing an actual value of a predetermined monitor item with upper and lower limits thereof, and determining whether a molded product is non-defective or defective, on the basis of the comparison results, but also has a function for automatically setting the upper and lower limits. Specifically, when a predetermined number of initial shots have been completed after start of the continuous automatic operation, an actual value x of each monitor item is measured every time a predetermined number of shots are performed, and for each monitor item at least a variation range R of the actual value x ($R=x_{max}-x_{min}$) and an intermediate value Mi of the actual value x ($Mi=x_{min}+(R/2)$) are statistically calculated. On the basis of the results of this calculation, upper and lower limits for each monitor item are automatically determined in such a manner that the upper and lower limits are separated from the intermediate value Mi by equal amounts.

Incidentally, when a determination condition is set for products which are not required to have very high quality, the determination condition is preferably set by use of molding data of non-defective products having some degree of variation, rather than molding data of the best quality products, because use of such a determination condition increases yield and enables efficient production.

However, the conventional methods for automatically setting determination conditions fail to consider collecting only molding data which are desirable for setting determination conditions, and simply collects molding data after data values have become stable. Therefore, the conventional methods encounter difficulty in setting appropriate determination conditions, and take time for fine adjustment, resulting in an increase in man-hours involved in setting work, thereby hindering enjoyment of the merits of automation.

SUMMARY OF THE INVENTION

An object of the present invention is to provide a method for setting a determination condition; i.e., conditions for determining whether a molded product is non-defective or defective, which method enables an operator to easily set an appropriate determination condition.

Another object of the present invention is to provide a method for setting a determination condition, which method can eliminate or facilitate fine adjustment to thereby reduce man-hours involved in setting work.

To achieve the above objects, the present invention provides a method for setting a determination condition for determining whether a molded product is non-defective or defective, the method comprising the steps of: performing a molding operation a predetermined number of times; detecting, in each molding operation, an actual value of at least one monitor item which can serve as the basis for determining whether a molded product is non-defective or defective; displaying the detected actual values on a screen of a display in such a manner that a distribution of the actual values can be visually grasped; designating a sampling zone for the displayed actual values in such a manner that a portion of the displayed actual values are contained in the sampling zone; and automatically setting the determination condition on the basis of actual values contained in the sampling zone.

DETAILED DESCRIPTION OF THE PREFERRED EMBODIMENT

An embodiment of the present invention will next be described in detail with reference to the drawings. The accompanying drawings are illustrative of the embodiment and are not meant to limit the scope of the invention. In order to describe the invention clearly, detailed description of known features is omitted.

The configuration of an injection molding machine M which employs a determination condition setting method according to the present embodiment will be described with reference to FIGS. 2 and 3.

Figure 2:
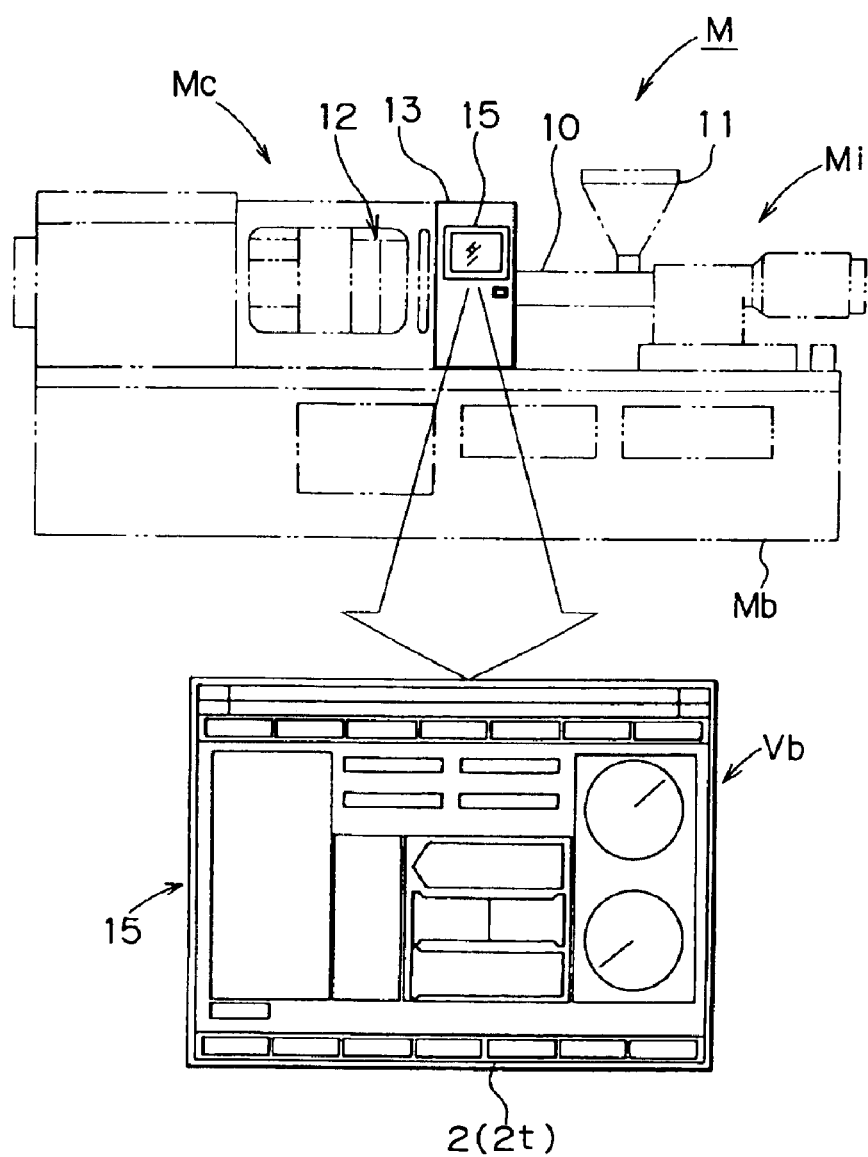
FIG. 2 is a schematic diagram of an injection molding machine in which the determination condition setting method is used.

The injection molding machine M, which is depicted by an imaginary line in FIG. 2, includes a machine base Mb; and an injection unit Mi and a mold clamping unit Mc, which are disposed on the machine base Mb. The injection unit Mi includes a heating barrel 10; an unillustrated injection nozzle attached to the front end of the heating barrel 10; and a hopper 11 disposed on a rear portion of the heating barrel 10 and adapted to supply a material to the heating barrel 10. Meanwhile, the mold clamping unit Mc includes a mold 12 consisting of a movable mold half and a stationary mold half. Moreover, a side panel 13 is disposed upright on the machine base Mb; and a display unit 15 is disposed on the side panel 13. The display unit 15 includes a display 2, such as a color liquid-crystal display, combined with a touch panel 2t attached to the front face of the display 2. The display unit 15 is connected to a controller 20 (FIG. 3) accommodated within the machine base Mb.

Figure 3:
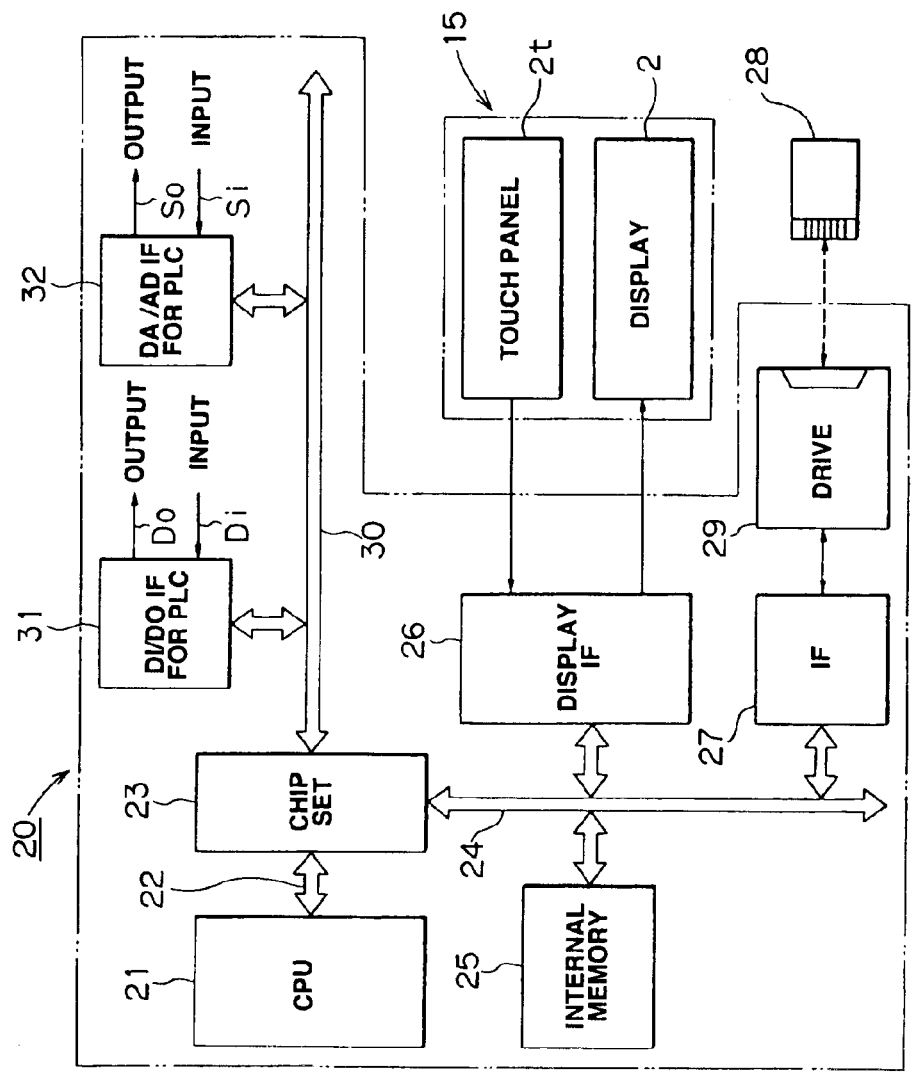
FIG. 3 is a functional block diagram of a controller provided in the injection molding machine.

FIG. 3 shows a block diagram of the controller 20. Reference numeral 21 denotes a CPU, to which a chip set 23 is connected via an internal bus 22. A bus line 24, formed of a local bus such as a PCI bus, is connected to the chip set 23 in order to form an HMI (human machine interface) control system. In order to form the HMI system, an internal memory section 25, including various types of memory such as RAM and ROM, is connected to the bus line 24. Further, the above-mentioned display unit 15 is connected to the bus line 24 via a display interface 26; and a drive unit 29 for reading data from and writing data to a storage medium 28 such as a memory card is connected to the bus line 24 via an input/output interface 27.

Meanwhile, a bus line 30, similar to the bus line 24, is connected to the chip set 23 in order to form a PLC (programmable logic controller) control system. For formation of the PLC system, input/output interfaces 31 and 32 are connected to the bus line 30. The input/output interface 31 receives switch data Di output from switches, etc., and feeds them to the CPU 21. Further, the input/output interface 31 receives control instruction data Do output from the CPU 21 and feeds them to corresponding actuators. The input/output interface 32 converts analog detection signals Si from various sensors to corresponding digital signals, and feeds the digital signals to the CPU 21. Further, the input/output interface 32 converts digital control instruction data from the CPU 21 to corresponding analog control signals So, and feeds the analog control signals So to the corresponding actuators. Thus, predetermined feedback control systems and open-loop control systems are configured.

Therefore, the above-describe internal memory section 25 stores a PLC program and an HMI program, as well as various other processing programs. Notably, the PLC program is software which realizes, for example, sequence operations of the injection molding machine M in various steps, and monitoring of the injection molding machine M. The HMI program is software which realizes, for example, setting and display of operation parameters of the injection molding machine M, and display of operation monitor data of the injection molding machine M. These programs are configured as an architecture peculiar to the injection molding machine M, which includes the controller 20, and in particular, these programs enable the controller 20 to perform the determination condition setting method according to the present embodiment.

Next, the determination condition setting method according to the present embodiment will be described with reference to FIGS. 1 to 5.

Figure 1:
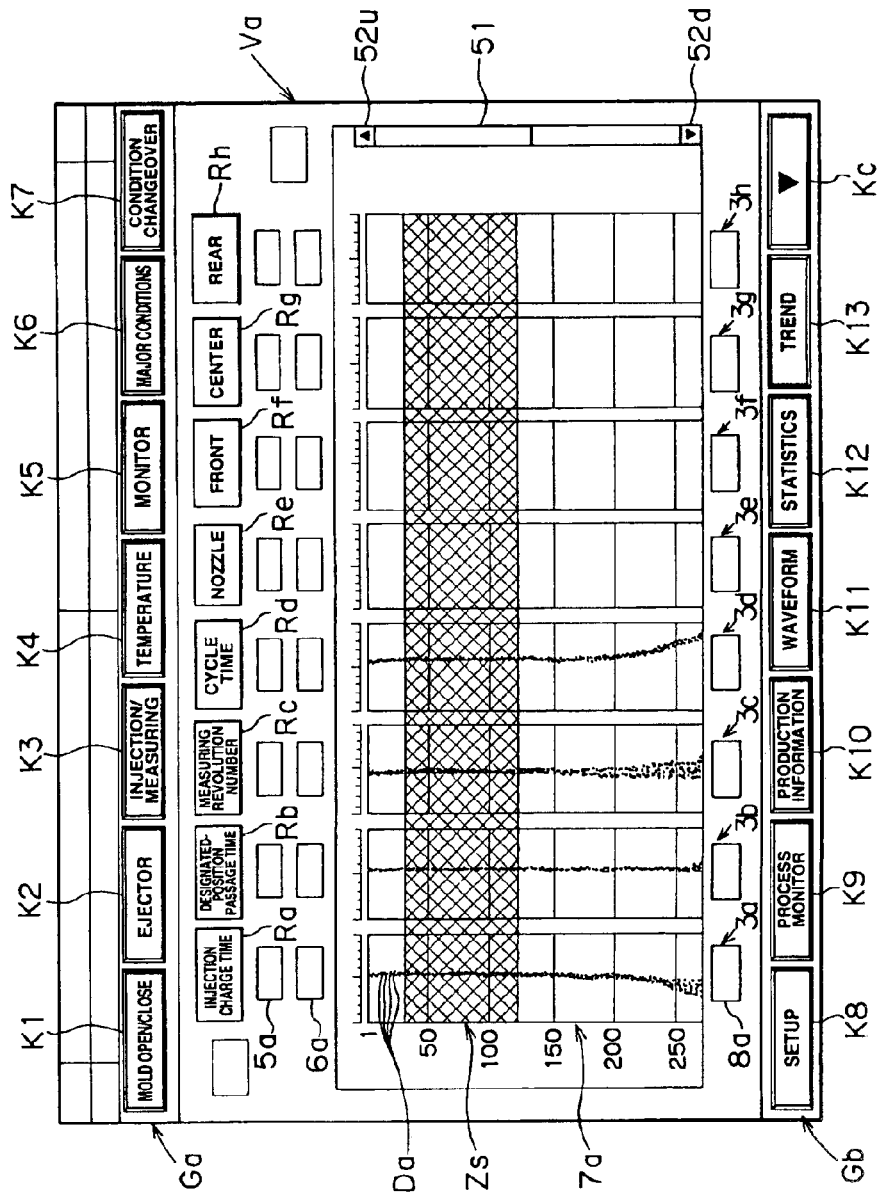
FIG. 1 is a diagram of a trend screen used in a determination condition setting method according to an embodiment of the present invention, showing a state after a sampling zone has been designated.

First, a trend screen Va used in the determination condition setting method according to the present embodiment will be described. FIG. 1 shows the trend screen Va displayed on the display 2. A plurality of screen selection keys K1, K2, K3, etc., which correspond to different screens Va, etc., and are used to select the respective screens are displayed in an upper row and a lower row of the trend screen Va. These screen selection keys K1, etc., are classified in accordance with their frequencies of use. Specifically, a first group Ga of keys relating to setting of operation conditions of the molding machine, such as a mold open/close screen selection key K1, an ejector screen selection key K2, an injection/metering screen selection key K3, a temperature screen selection key K4, a monitor screen selection key K5, a major condition screen selection key K6, and a condition changeover screen selection key K7, are disposed in the upper row in such a manner that these keys are arranged along a single horizontal row, whereas a second group Gb of keys, including the remaining keys; i.e., a setup screen selection key K8, a process monitor screen selection key K9, a production information screen selection key K10, a waveform screen selection key K11, a statistic screen selection key K12, and a trend screen selection key K13, are disposed in the lower row in such a manner that these keys are arranged along a single horizontal row.

The screen selection keys K1, etc., are similarly displayed even when the trend screen Va is switched to a different screen. For example, FIG. 2 schematically shows a process monitor screen Vb selected upon operation of the process monitor screen selection key K9, and in this screen as well, the screen selection keys K1, etc. are displayed in the same shape and at the same locations as in the trend screen Va shown in FIG. 1. Notably, the keys of the second group Gb shown in FIG. 1 are located on the first hierarchical level. When a screen level changeover key Kc at the right end of the screen is touched, a history screen selection key, a program screen selection key, a signal recorder screen selection key, a diagnosis screen selection key, etc., which are on the second hierarchical level, are displayed in a similar manner, in place of the screen selection keys K8 to K13. Moreover, the controller 20 has an arrangement change function for enabling a user to arbitrarily change the arrangement of the screen selection keys K1, etc., and an arrangement storage function for storing the changed arrangement. This allows the user to freely change the arrangement (order) of the screen selection keys K1, etc. in consideration of easiness of use. By virtue of the above-described layout display, even when the titles displayed on the respective screen selection keys K1, etc. are to be changed, such change can be easily performed by means of software, thereby reducing man-hours and cost stemming from the change. In addition, the visibility and easiness of operation of the screen selection keys K1, etc. can be enhanced.

A main portion of the trend screen Va is displayed between the upper side screen selection keys K1, etc. and the lower side screen selection keys K8, etc. The main portion of the trend screen Va has eight trend display sections $3a$, $3b$, $3c$, $3d$, $3e$, $3f$, $3g$, and $3h$ arranged along a horizontal direction. These trend display sections $3a$, etc. have at their uppermost positions monitor item display sections Ra, Rb, Rc, Rd, Re, Rf, Rg, and Rh, which display corresponding monitor items which can serve as the basis for determining whether a molded product is non-defective or defective. Names of the monitor items; i.e., "Injection Charge Time," "Screw-Designated-Position Passage Time," "Measuring Revolution Number," "Cycle Time," "Injection Nozzle Temperature," "Heating Barrel Front Portion Temperature," "Heating Barrel Center Portion Temperature," and "Heating Barrel Rear Portion Temperature" are respectively displayed in the monitor item display sections Ra, Rb, Rc, Rd, Re, Rf, Rg, and Rh, in a complete form or a simplified form.

In each trend display section, for example, the trend display section $3a$, in addition to the monitor item display section Ra, a center value display section $5a$, a present value display section $6a$, a data display section $7a$, a range display section $8a$ are arranged in this order in the downward direction from the monitor item display section Ra. The data display section $7a$ displays molding data (actual value) Da obtained in each shot in such a manner that the molding data is plotted in time series by use of dots (see FIG. 4). Therefore, the horizontal direction of the data display section $7a$ corresponds to the magnitude (time) of the molding data Da, and the vertical direction of the data display section $7a$ corresponds to the shot number. In the present embodiment, molding data sets for 250 shots are displayed in the data display section $7a$. Although the remaining molding data sets do not appear in the data display section $7a$, as indicated by an imaginary line $7s$ in FIG. 4, an operator can display them by scrolling the screen by use of a scroll bar 51 (or scroll buttons $52u$ and $52d$). The remaining trend display sections $3b$ to $3h$ are displayed in the same manner as the display section $3a$, except that their horizontal axes have different scales.

Figure 5:
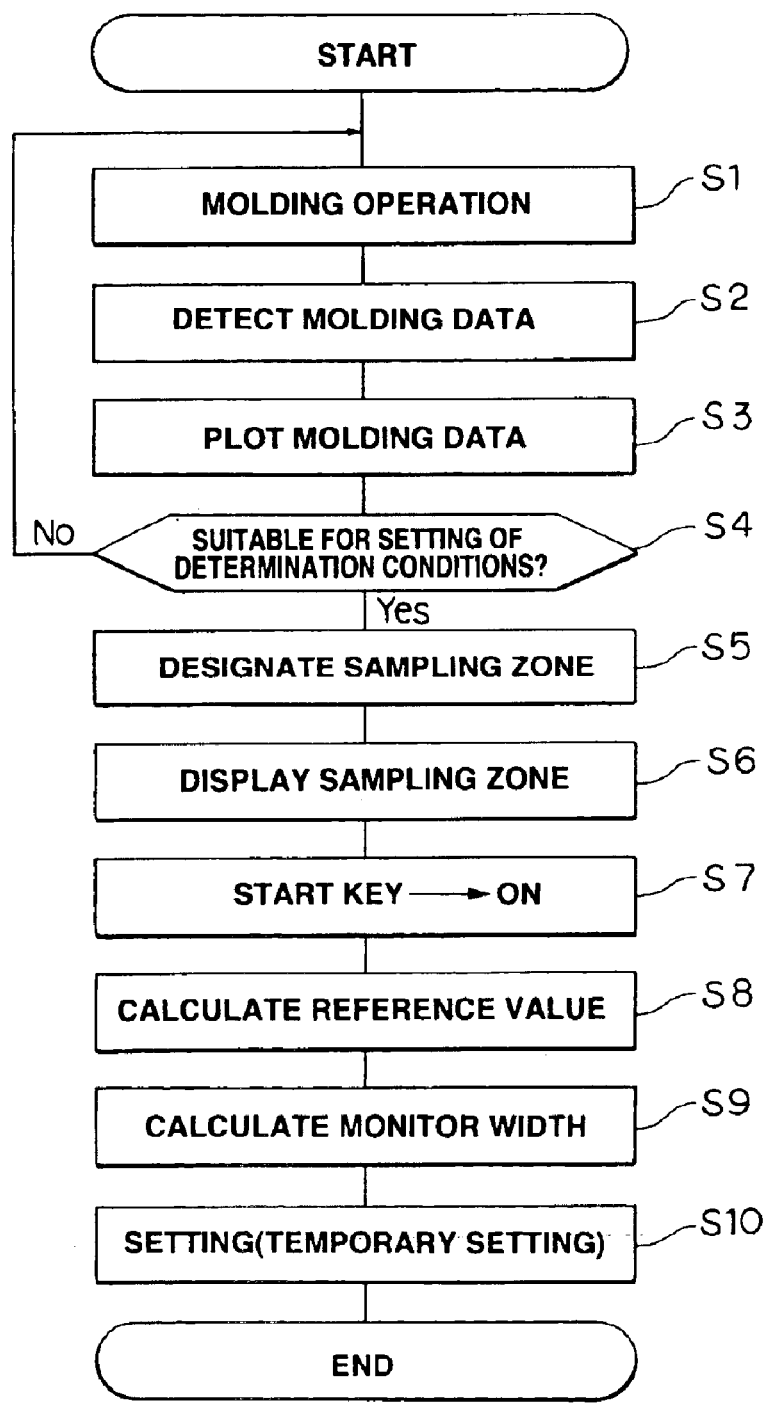
FIG. 5 is a flowchart showing the steps of the determination condition setting method.

Next, the steps of the determination condition setting method according to the present embodiment will be described in accordance with the flowchart of FIG. 5 and with reference to the remaining drawings.

Figure 4:
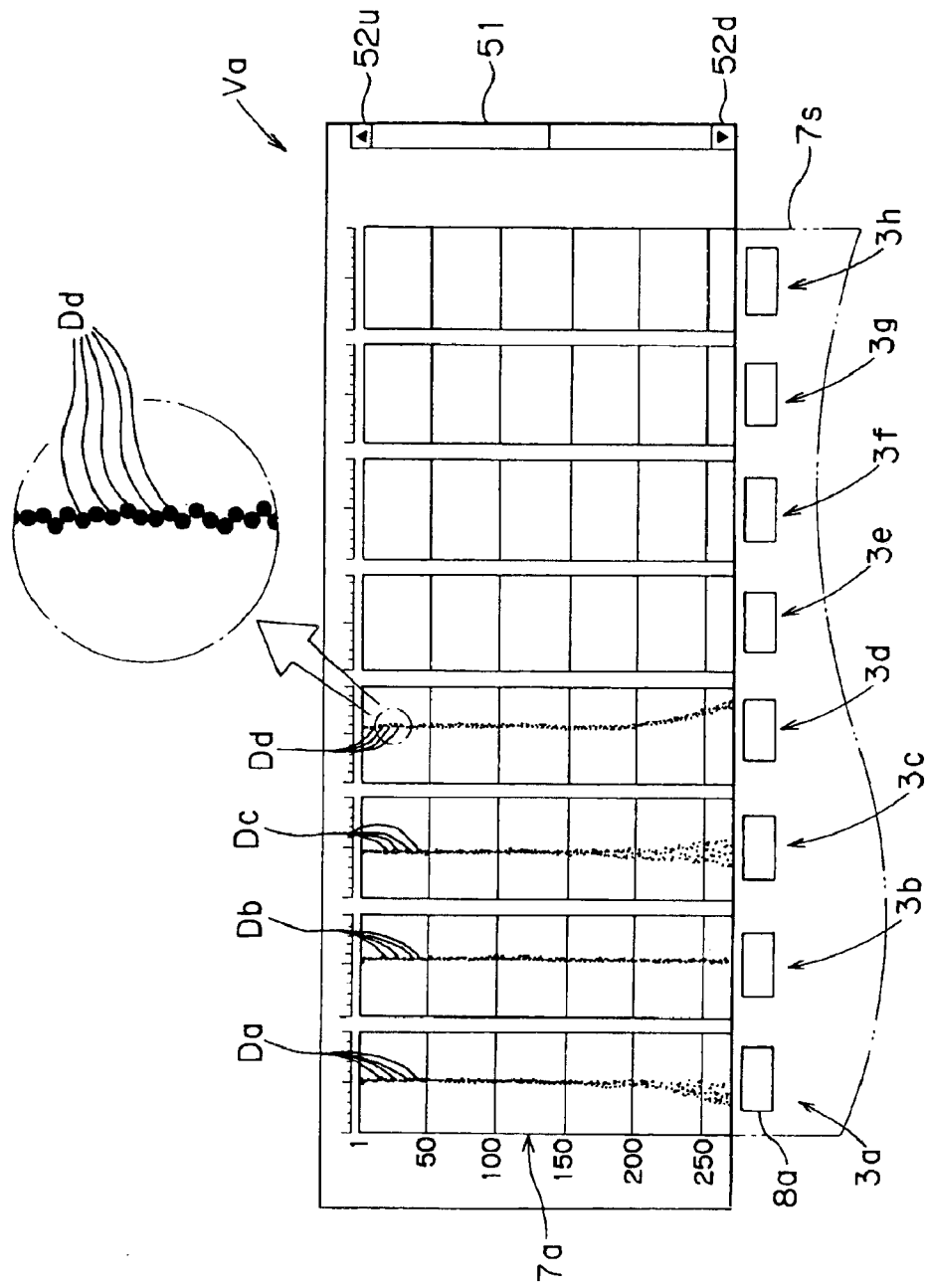
FIG. 4 is a diagram of a portion of the trend screen used in the determination condition setting method, showing a state before a sampling zone has been designated.

Now, the injection molding machine M is assumed in a state where setting of necessary molding conditions has been completed, and the injection molding machine M can produce non-defective products with a certain yield. In this state, the injection molding machine M is continuously operated to mold a product (step S1). This molding may be trial molding or molding for actual production. During the molding operation, molding data Da, etc. (actual values) of respective monitor items (Ra, etc.) are detected (step S2), and are plotted (i.e., displayed) by use of dots in the respective data display sections $7a$, etc., as shown in FIG. 4 (step S3). Notably, in FIG. 4, only the molding data Da, Db, Dc, and Dd in the data display sections $7a$ to $7d$ are shown, and the remaining molding data in the data display sections $7e$ to $7h$ are omitted for the sake of simplification.

An operator observes the respective data display sections $7a$, etc., and determines whether the present state of the injection molding machine M is suitable for setting determination conditions. If the operator determines that the present state is suitable for setting determination conditions, then the operator designates, for each data display section, a sampling zone Zs from which molding data Da, etc. are obtained for setting the determination conditions (steps S4, S5). Since the molding data Da, etc. are successively plotted by use of dots, the operator can visually grasp the distribution of actual values of each monitor item; in particular, as shown in FIG. 1, the operator can grasp at a glance all the distributions of the plurality of monitor items (Ra, etc.). Therefore, the operator designates a zone which the operator thinks is most suitable for setting the determination conditions, in consideration of not only time-course change in each monitor item (Ra, etc.), but also relative influences among the monitor items (Ra, etc.) and other factors. Notably, if necessary, the operator may scroll the screen by use of the scroll bar 51 (or the scroll buttons $52u$ and $52d$), and designate a sampling zone covering the portion displayed through the scrolling. The operator can designate a sampling zone Zs by touching the screen at two locations which define the upper and lower boundaries of the sampling zone Zs. As shown in FIG. 1, a horizontally extending screen area between the two locations is changed in color, whereby the sampling zone Zs is displayed (step S6).

Subsequently, the operator touches a start key, in response to which processing for automatically setting the determination conditions is started (step S7). First, the controller 20 calculates averages of the molding data Da, etc. which are included in the sampling zone Zs and stores them as reference values (step S8). For example, when the molding data Da, etc. of the monitor item (Ra) are represented by X1, X2, X3, ..., Xn and the number of shots is represented by n, the reference value Xs can be obtained by the equation Xs= (X1+X2+X3+ ... +Xn)/n. This reference value Xs is obtained for each of the monitor items (Ra, Rb, Rc, etc.).

Further, the controller 20 calculates a monitor width Cw by multiplying the standard deviation Es of the molding data Da, etc. within the sampling zone Zs by an adjustment coefficient Ki (S9). In this case, the monitor width Cw can be obtained by the equation Cw=Es·Ki; i.e., by multiplying, by Ki, the square root of $Es^2=\{(X1^2+X2^2+X3^2+\ldots+Xn^2)/n\}-Xs^2/n$. Notably, the monitor width Cw may be obtained by multiplying a variation coefficient U by an adjustment coefficient Kj, where the variation coefficient can be obtained by dividing the standard deviation Es of the molding data Da, etc. within the sampling zone Zs by the average (the reference value Xs) of the molding data Da, etc. within the sampling zone Zs. That is, the monitor width Cw can be obtained by the equation $Cw=U\cdot Kj=(Es/Xs)\cdot Kj$. In either case, the adjustment coefficient Ki or Kj is set to assume the optimal value for each monitor item (Ra, etc.). Further, the monitor width Cw is obtained for each monitor item (Ra, etc.). The thus obtained reference value Xs and monitor width Cw are stored in the internal memory section 25 as determination conditions (step S10). In this case, these values may be stored as final values, or as temporary values, which are finely adjusted in subsequent molding operations.

In the determination condition setting method according to the present embodiment, molding operation is performed a predetermined number of times in order to detect, in each molding operation, molding data (actual values) Da, etc. of the plurality of monitor items (Ra, etc.) which can serve as the basis for determining whether a molded product is non-defective or defective; and the molding data (actual values) Da, etc. are displayed on the trend screen Va of the display 2 in such a manner that distributions of the molding data Da, etc. of the respective monitor times (Ra, etc.) can be visually grasped; i.e., the molding data are plotted in time series by use of dots. When an operator designates a sampling zone Zs for the displayed molding data, the reference value Xs and the monitor width Cw (determination conditions) for determining whether a molded product is non-defective or defective are automatically set on the basis of the molded product Da, etc. contained in the sampling zone Zs. Therefore, the operator can easily set an appropriate determination condition. In addition, man-hours involved in setting work can be reduced through elimination or facilitation of fine adjustment.

While the present invention has been described with reference to the preferred embodiment, the present invention is not limited thereto. Regarding structural details, arrangement, numerical values, technique, among others, modifications and any omission or addition may be possible as needed without departing from the scope of the invention. For example, in the above-described embodiment, molding data Da, etc. are plotted by use of dots; however, they may be displayed by use of bars or the like, and if necessary, they may be displayed in the form of numerical values. Further, the present invention does not exclude the case where the determination conditions (the reference value Xs and the monitor width Cw) are calculated in a manner different from that employed in the above-described embodiment. Further, only a portion of the monitor items (Ra, etc.) exemplified in the above-described embodiment may be used, or other monitor items may be added.

What is claimed is:

1. A method for setting a determination condition used for determining whether a molded product is non-defective or defective, the method comprising the steps of:
   performing a molding operation a predetermined number of times;
   detecting, in each molding operation, an actual value of at least one monitor item which can serve as the basis for determining whether a molded product is non-defective or defective;
   displaying the detected actual values on a screen of a display in such a manner that a distribution of the actual values can be visually grasped;
   designating a sampling zone for the displayed actual values in such a manner that a portion of the displayed actual values are contained in the sampling zone; and
   automatically setting the determination condition on the basis of actual values contained in the sampling zone.

2. A method for setting a determination condition according to claim 1, wherein the actual values are plotted in time series on the screen by use of dots or bars.

3. A method for setting a determination condition according to claim 1, wherein a touch panel is attached to a front face of the display, and the sampling zone is designated by touching the touch panel at two arbitrary locations which define upper and lower boundaries of the sampling zone.

4. A method for setting a determination condition according to claim 3, wherein actual values of two or more monitor items are displayed in corresponding display areas provided in parallel, and the touch panel is touched at two arbitrary locations in order to designate sampling zones for all the monitor items.

5. A method for setting a determination condition according to claim 1, wherein the determination condition is a reference value obtained by averaging actual values within the sampling zone.

6. A method for setting a determination condition according to claim 1, wherein the determination condition is a monitor width obtained by multiplying a standard deviation of the actual values within the sampling zone by an adjustment coefficient.

7. A method for setting a determination condition according to claim 6, wherein the adjustment coefficient, by which the standard deviation is multiplied, is set for each of monitor items.

8. A method for setting a determination condition according to claim 1, wherein the determination condition is a monitor width obtained by multiplying a variation coefficient by an adjustment coefficient, where the variation coefficient is obtained by dividing a standard deviation of the actual values within the sampling zone by the average of the actual values within the sampling zone.

9. A method for setting a determination condition according to claim 8, wherein the adjustment coefficient, by which the variation coefficient is multiplied, is set for each of monitor items.

10. A method for setting a determination condition according to claim 1, wherein the monitor item includes one or more selected from injection charge time, screw-designated-position passage time, measuring revolution number, cycle time, heating barrel temperature, and injection nozzle temperature.

11. A method for setting a determination condition used for determining whether a molded product is non-defective or defective, the method comprising the steps of:
    performing a molding operation a predetermined number of times;
    detecting, in each molding operation, an actual value of at least one monitor item which can serve as the basis for determining whether a molded product is non-defective or defective;
    displaying the detected actual values on a screen of a display;
    visually grasping a distribution of the displayed actual values;
    designating a sampling zone for the displayed actual values based on the visually grasped distribution so as a portion of the displayed actual values in the sampling zone; and
    automatically setting the determination condition on the basis of actual values contained in the sampling zone.

* * * * *